United States Patent
Kim et al.

(10) Patent No.: US 12,422,405 B2
(45) Date of Patent: Sep. 23, 2025

(54) FINE DUST MASS MEASUREMENT DEVICE AND OPERATING METHOD THEREOF

(71) Applicants: SAMSUNG ELECTRONICS CO., LTD., Suwon-si (KR); RESEARCH & BUSINESS FOUNDATION SUNGKYUNKWAN UNIVERSITY, Suwon-si (KR)

(72) Inventors: Ilhwan Kim, Suwon-si (KR); Changhyeon Kim, Suwon-si (KR); Kangyoon Lee, Seoul (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 361 days.

(21) Appl. No.: 18/204,559

(22) Filed: Jun. 1, 2023

(65) Prior Publication Data
US 2024/0192172 A1    Jun. 13, 2024

(30) Foreign Application Priority Data
Dec. 9, 2022    (KR) .................. 10-2022-0171867

(51) Int. Cl.
    *G01N 29/02*    (2006.01)
    *G01N 29/44*    (2006.01)

(52) U.S. Cl.
    CPC ....... *G01N 29/022* (2013.01); *G01N 29/4436* (2013.01); *G01N 2291/02408* (2013.01)

(58) Field of Classification Search
    CPC ............. G01N 29/022; G01N 29/4436; G01N 2291/02408; G01N 29/036; G01N 15/02; G01N 15/10; G01N 29/44; G01N 2015/0096; G01N 2015/1021; G01N 2291/0289; G01N 2291/0423
    See application file for complete search history.

(56) References Cited

U.S. PATENT DOCUMENTS

| | | | |
|---|---|---|---|
| 6,435,013 B1 * | 8/2002 | Rodriguez | G01N 15/02 73/61.42 |
| 7,762,124 B2 | 7/2010 | Okaguchi et al. | |
| 7,803,632 B2 | 9/2010 | Okaguchi et al. | |
| 9,821,310 B2 * | 11/2017 | Guldiken | G01N 33/5005 |

(Continued)

FOREIGN PATENT DOCUMENTS

| | | | |
|---|---|---|---|
| CN | 111157393 B | 7/2022 | |
| CN | 109696481 B * | 3/2024 | G01N 29/22 |

(Continued)

*Primary Examiner* — Francis C Gray
(74) *Attorney, Agent, or Firm* — Sughrue Mion, PLLC

(57) ABSTRACT

A dust mass measurement device includes a sensing channel configured to generate a sensing clock signal, a reference channel configured to generate a reference clock signal, a counter configured to generate a first output signal based on the sensing clock signal, and generate a second output signal based on the reference clock signal, and a controller configured to calculate a frequency difference between the sensing clock signal and the reference clock signal based on a difference value between the first output signal and the second output signal, which are received from the counter, and measure a mass of dust based on the calculated frequency difference.

20 Claims, 10 Drawing Sheets

(56) References Cited

U.S. PATENT DOCUMENTS

| | | | |
|---|---|---|---|
| 2005/0081635 A1 | 4/2005 | Kobayashi | |
| 2007/0137287 A1* | 6/2007 | Liu | G01N 33/2888 |
| | | | 73/61.75 |
| 2007/0252475 A1 | 11/2007 | Okaguchi et al. | |
| 2009/0060790 A1* | 3/2009 | Okaguchi | G01N 29/022 |
| | | | 422/68.1 |
| 2011/0111516 A1 | 5/2011 | Lee et al. | |
| 2019/0212300 A1* | 7/2019 | Cole | G01N 29/022 |
| 2020/0200712 A1* | 6/2020 | Jesorka | G01N 29/222 |
| 2020/0264117 A1* | 8/2020 | Deshpande | G01N 29/348 |

FOREIGN PATENT DOCUMENTS

| | | | |
|---|---|---|---|
| JP | 4702452 B2 | | 6/2011 |
| JP | 4760906 B2 | | 8/2011 |
| JP | 2011232231 A | * | 11/2011 |
| KR | 10-1638811 B1 | | 7/2016 |

* cited by examiner

FINE DUST MASS MEASUREMENT DEVICE AND OPERATING METHOD THEREOF

CROSS-REFERENCE TO RELATED APPLICATION

This application is based on and claims priority under 35 U.S.C. § 119 to Korean Patent Application No. 10-2022-0171867, filed on Dec. 9, 2022, in the Korean Intellectual Property Office, the disclosure of which is incorporated by reference herein in its entirety.

BACKGROUND

1. Field

The disclosure relates to a fine dust mass measurement device and an operating method thereof.

2. Description of the Related Art

Fine dust is an invisible substance that may be generated from combustion of fossil fuels, such as coal and oil, or may be discharged from manufacturing facilities or exhaust gases, such as automobile exhaust. Generally, fine dust refers to particulate matter with a diameter of 10 μm or less.

Fine dust in the air may penetrate into human lungs and bloodstream and cause environmental or health-related problems, such as DNA mutations, heart attacks, respiratory diseases, skin diseases, and eye diseases. In particular, ultrafine dust classified as PM 2.5 or less or ultra fine particle (UFP) can be especially dangerous as they may penetrate deep into the bronchi and lungs in the human body and cause serious diseases.

In order to mitigate environmental or health-related problems caused by fine dust, it may be necessary to measure the mass or mass concentration of fine dust present in the air. Accordingly, there is a need for a method of precisely measuring the mass or mass concentration of fine dust.

SUMMARY

One or more embodiments of the present disclosure provide a device and a method for measuring the mass (or mass concentration) of fine dust to detect a frequency change by using a surface acoustic wave (SAW) sensor based on the size of fine dust to be measured, and to measure the mass of fine dust based on the frequency change.

The device according to embodiments may include a sensing channel and a reference channel, each including a surface acoustic wave sensor. The device may measure the mass of fine dust by detecting the frequency difference between the sensing channel and the reference channel.

In a case in which the frequency difference is detected through a mixer, power consumption may excessively increase during the measurement of fine dust mass. Additionally, due to the limited range of frequency differences that can be detected (i.e., the resolution), the device according to embodiments of the present disclosure uses a novel method capable of precisely detecting a frequency difference through a counter while reducing power consumption.

One or more embodiments of the present disclosure provide a fine dust mass measurement device capable of precisely measuring the mass of fine dust with low power consumption by using a counter, compared to the case of measuring the mass of fine dust by using a mixer.

The technical problems of the present disclosure are not limited to the above-described description, and other technical problems may be clearly understood by one of ordinary skill in the art from the present specification and the attached drawings.

Additional aspects will be set forth in part in the description which follows and, in part, will be apparent from the description, or may be learned by practice of the presented embodiments of the disclosure.

According to an aspect of the disclosure, a dust mass measurement device may include: a sensing channel configured to generate a sensing clock signal, the sensing channel including a first surface acoustic wave sensor configured to generate a surface acoustic wave and a first amplifier configured to amplify the surface acoustic wave generated by the first surface acoustic wave sensor; a reference channel configured to generate a reference clock signal, the reference channel including a second surface acoustic wave sensor configured to generate a surface acoustic wave and a second amplifier configured to amplify the surface acoustic wave generated by the second surface acoustic wave sensor; a counter electrically connected to the sensing channel and the reference channel and configured to generate a first output signal based on the sensing clock signal, and generate a second output signal based on the reference clock signal; and a controller electrically connected to the counter and configured to: calculate a frequency difference between the sensing clock signal and the reference clock signal based on a difference value between the first output signal and the second output signal; and measure a mass of particulate matter based on the frequency difference between the sensing clock signal and the reference clock signal.

The first surface acoustic wave sensor and the first amplifier form a first feedback loop, and wherein the second surface acoustic wave sensor and the second amplifier form a second feedback loop.

The dust mass measurement device may further include a first buffer having one end connected to the sensing channel and another end connected to the counter, the first buffer being configured to adjust a voltage of the sensing clock signal transmitted from the sensing channel to the counter.

The dust mass measurement device may further include a second buffer having one end connected to the reference channel and another end connected to the counter, the second buffer being configured to adjust a voltage of the reference clock signal transmitted from the reference channel to the counter.

The controller may be further configured to control the sensing channel to generate the sensing clock signal after a specified time has elapsed from a time point at which the reference clock signal is generated by the reference channel.

The counter may include an asynchronous counter including a plurality of flip-flops.

The counter may include: a first asynchronous counter electrically connected to the sensing channel and configured to generate the first output signal based on the sensing clock signal; and a second asynchronous counter electrically connected to the reference channel and configured to generate the second output signal based on the reference clock signal.

Each of the first asynchronous counter and the second asynchronous counter may include a plurality of D-type flip-flops that are connected in series.

The controller may be further configured to generate a mask signal for enabling a counting operation of the counter, and the counter may be further configured to count a number of clocks of the sensing clock signal or the reference clock signal based on the mask signal received from the controller.

The controller may be further configured to receive the first output signal or the second output signal from the counter after a specified time has elapsed from a time point at which the counting operation of the counter is stopped.

The controller may be further configured to reset the counter when the first output signal or the second output signal is received from the counter.

The controller may be further configured to: convert the difference value between the first output signal and the second output signal, which are received from the counter, into a preset format; and calculate the frequency difference between the sensing clock signal and the reference clock signal based on the converted difference value between the first output signal and the second output signal and a length of the mask signal.

The controller may be further configured to: convert the difference value between the first output signal and the second output signal, which is output as a digital signal, into a decimal number; and calculate the frequency difference between the sensing clock signal and the reference clock signal by dividing the decimal number indicating the difference value between the first output signal and the second output signal, by the length of the mask signal.

According to another aspect of the present disclosure, an operating method of a dust mass measurement device may include: generating a sensing clock signal through a sensing channel, the sensing channel including a first surface acoustic wave sensor configured to generate a surface acoustic wave and a first amplifier configured to amplify the surface acoustic wave generated by the first surface acoustic wave sensor; generating a reference clock signal through a reference channel, the reference channel including a second surface acoustic wave sensor configured to generate a surface acoustic wave and a second amplifier configured to amplify the surface acoustic wave generated by the second surface acoustic wave sensor; generating a first output signal through an asynchronous counter based on the sensing clock signal; generating a second output signal through the asynchronous counter based on the reference clock signal; calculating a frequency difference between the sensing clock signal and the reference clock signal through a controller based on a difference value between the first output signal and the second output signal; and measuring a mass of particulate matter through the controller based on the frequency difference between the sensing clock signal and the reference clock signal.

The generating of the sensing clock signal may include generating the sensing clock signal after a specified time has elapsed from a time point at which the reference clock signal is generated.

The calculating of the frequency difference between the sensing clock signal and the reference clock signal may include: generating a mask signal for enabling a counting operation of the asynchronous counter; counting a number of clocks of the sensing clock signal or the reference clock signal based on the generated mask signal; and receiving the first output signal or the second output signal after a specified time has elapsed from a time point at which the counting operation of the asynchronous counter is stopped.

The calculating of the frequency difference between the sensing clock signal and the reference clock signal may include: converting the difference value between the received first output signal and the received second output signal into a preset format; and calculating the frequency difference between the sensing clock signal and the reference clock signal based on the converted difference value between the first output signal and the second output signal and a length of the mask signal.

The operating method may further include resetting the asynchronous counter when the first output signal or the second output signal is received.

According to another aspect of the present disclosure, there is provided a computer-readable recording medium having recorded thereon a program for implementing the operating method.

According to another aspect of the present disclosure, a particulate matter measurement device may include: a first oscillator circuit including a first surface acoustic wave sensor configured to generate a first surface acoustic wave and output a sensing clock signal based on the first surface acoustic wave; a second oscillator circuit including a second surface acoustic wave sensor configured to generate a second surface acoustic wave and output a reference clock signal based on the second surface acoustic wave; a counter configured to count a number of clocks of the sensing clock signal and the reference clock signal while a counting operation of the counter is enabled; and a processor configured to: determine a frequency difference between the sensing clock signal and the reference clock signal based on a clock count difference between the number of clocks counted from the sensing clock signal and the number of clocks counted from the reference clock signal; and measure a mass of particulate matter based on the frequency difference between the clock count difference.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
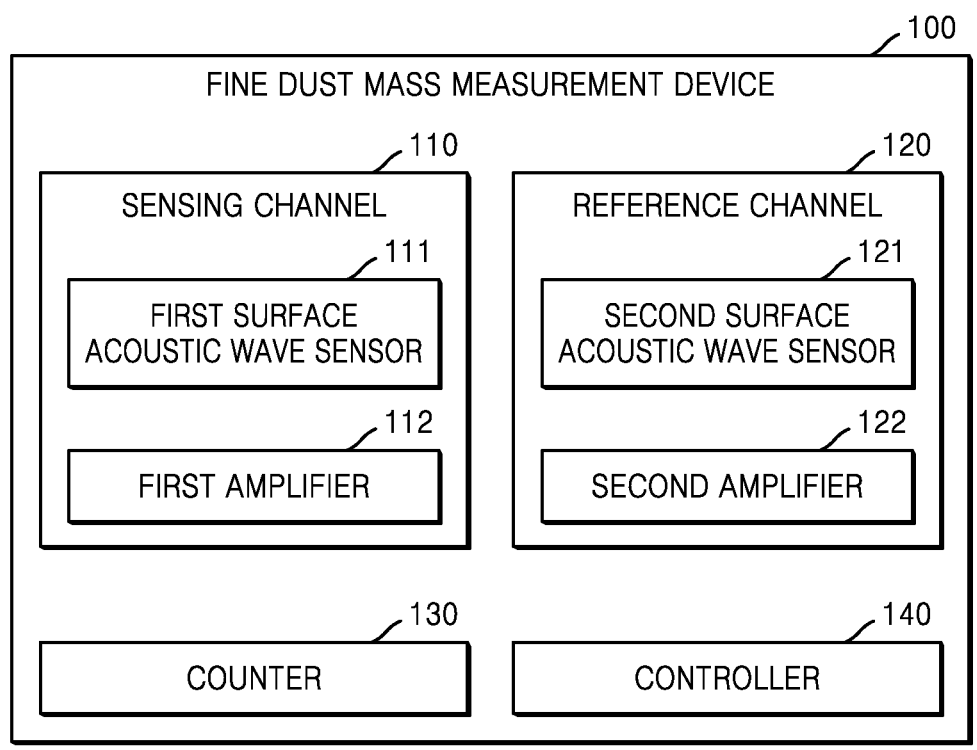
FIG. 1 is a block diagram illustrating elements of a fine dust mass measurement device, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

With respect to the terms used to describe the various embodiments, general terms which are currently and widely used are selected in consideration of functions of structural elements in the various embodiments of the present disclosure. However, meanings of the terms may be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

Throughout the descriptions of embodiments, when an element is referred to as being "connected" or "coupled" to another element, it can be directly connected or coupled to the other element, or can be electrically connected or coupled to the other element with intervening elements interposed therebetween. The terms "comprises" and/or "comprising" or "includes" and/or "including" when used in this specification, specify the presence of stated elements, but do not preclude the presence or addition of one or more other elements.

Terms "configured" or "include" used herein should not be construed as necessary including all of several components or several steps written in the specification, but as not including some of the components or steps or as further including additional components or steps.

While such terms as "first," "second," etc., may be used to describe various components, such components must not be limited to the above terms. The above terms are used only to distinguish one component from another.

The term "dust" may refer to a fine particle or particulate matter (PM) in the air. Examples of different types of particulate matter (PM) include dust, dirt, carbon particles, pollen, mold spores, soot, ash, metal particles, and chemicals. The "fine particle" or "particular matter" may refer to a particle having a size of 100 μm or less in diameter, but the size of the fine particle or particular matter is not limited thereto.

The descriptions of embodiments below should not be construed as limiting the right scope of the accompanying claims, and it should be construed that all of the technical ideas included within the scope equivalent to the claims are included within the right scope of embodiments. Exemplary embodiments of the disclosure will now be described more fully with reference to the accompanying drawings.

FIG. 1 is a block diagram illustrating elements of a fine dust mass measurement device 100, according to an embodiment. The fine dust mass measurement device 100 may collect data that represents a particle count or concentration in units such as micrograms per cubic meter ($\mu g/m^3$) or parts per million (ppm). The fine dust mass measurement device 100 may use the data to monitor air quality in indoor and outdoor environments and to identify potential health hazards associated with high levels of particulate matter in the air.

Referring to FIG. 1, the fine dust mass measurement device 100 according to an embodiment may measure the mass or mass concentration of fine dust in the air, and may include a sensing channel 110, a reference channel 120, a counter 130, and a controller 140. Depending on embodiments, the fine dust mass measurement device 100 may be referred to as a 'fine dust mass concentration measurement device,' but the disclosure is not limited thereto.

The sensing channel 110 is a type of circuit that operates as an oscillator, and may generate a sensing clock signal for measuring the mass (or 'mass concentration') of fine dust in the air.

According to an embodiment, the sensing channel 110 may include a first surface acoustic wave sensor 111 that generates a surface acoustic wave and a first amplifier 112 that amplifies the surface acoustic wave generated by the first surface acoustic wave sensor 111. In other words, the sensing channel 110 may be implemented as a circuit composed of the first surface acoustic wave sensor 111 and the first amplifier 112. In the disclosure, the 'surface acoustic wave' may refer to a type of acoustic wave propagating along the surface of a material, and frequency characteristics of the surface acoustic wave may change as the mass or mass concentration of fine dust in the air changes.

The first surface acoustic wave sensor 111 may include a piezoelectric material, and may generate a surface acoustic wave having a specific frequency when voltage is applied thereto. For example, the first surface acoustic wave sensor 111 may generate a surface acoustic wave having a specific resonant frequency when voltage is applied thereto.

The first amplifier 112 may amplify the surface acoustic wave generated by the first surface acoustic wave sensor 111. For example, the first amplifier 112 may be a radio frequency (RF) amplifier having a specific gain (e.g., about 35 dB or more), but the embodiment is not limited thereto.

The first amplifier 112 may be electrically connected to the first surface acoustic wave sensor 111, so that the system gain of the sensing channel 110 satisfies an oscillation condition of the first surface acoustic wave sensor 111 at the resonant frequency. For example, the first amplifier 112 may form a feedback loop with the first surface acoustic wave sensor 111 that is electrically connected to the first amplifier 112, but a more detailed description of this will be provided below.

In the disclosure, the 'oscillation condition' may refer to a gain condition required for a system to oscillate the surface acoustic wave at the resonant frequency, and this expression will be used in the same way throughout the disclosure. For example, when the total gain of the system for generating the surface acoustic wave is 0 dB or more, the surface acoustic wave may oscillate at the resonant frequency of the surface acoustic wave sensor, but the disclosure is not limited thereto.

The reference channel 120 is also an oscillator circuit, similar to the sensing channel 110. The reference channel

120 may generate a reference clock signal that serves as a reference for detecting a change in mass of fine dust in the air.

According to an embodiment, the reference channel 120 may include a second surface acoustic wave sensor 121 that generates a surface acoustic wave and a second amplifier 122 that amplifies the surface acoustic wave generated by the second surface acoustic wave sensor 121. That is, the reference channel 120 may be implemented as a circuit including the second surface acoustic wave sensor 121 and the second amplifier 122, which is substantially the same as or similar to the sensing channel 110.

The second surface acoustic wave sensor 121 may include a piezoelectric material, and may generate a surface acoustic wave having a specific frequency when voltage is applied thereto. For example, the second surface acoustic wave sensor 121 may generate a surface acoustic wave having a specific frequency when voltage is applied thereto.

The second amplifier 122 may amplify the surface acoustic wave generated by the second surface acoustic wave sensor 121. For example, the second amplifier 122 may be a radio frequency (RF) amplifier having a certain gain, but the disclosure is not limited thereto.

The second amplifier 122 may be electrically connected to the second surface acoustic wave sensor 121, so that the system gain of the reference channel 120 satisfies an oscillation condition of the second surface acoustic wave sensor 121 at the resonant frequency. For example, the second amplifier 122 may form a feedback loop with the second surface acoustic wave sensor 121 that is electrically connected to the second amplifier 122, but a more detailed description of this will be provided below.

The counter 130 is a type of circuit for counting received clock signals, and may count the sensing clock signal and the reference clock signal. For example, the counter 130 may be electrically connected to the sensing channel 110 and the reference channel 120, and may receive the sensing clock signal and the reference clock signal from the sensing channel 110 and the reference channel 120, respectively, and count the number of pulses of the received sensing clock signal and the received reference clock signal.

In an example, the counter 130 may be electrically connected to an output terminal of the sensing channel 110, and may receive the sensing clock signal from the sensing channel 110 and count the number of pulses of the received sensing clock signal. In another example, the counter 130 may be electrically connected to an output terminal of the reference channel 120, and may receive the reference clock signal from the reference channel 120 and count the number of pulses of the received reference clock signal.

The controller 140 may control overall operations of the fine dust mass measurement device 100. For example, the controller 140 may include at least one processor. The processor may be implemented as an array of a plurality of logic gates, or may be implemented as a combination of a general-purpose microprocessor and a memory in which programs executable by the microprocessor are stored. Depending on embodiments, those of ordinary skill in the art may understand that the controller 140 may be implemented in other types of hardware.

According to an embodiment, the controller 140 may be electrically connected to the counter 130, and may control the counting operation of the counter 130 and measure the mass or mass concentration of fine dust in the air based on a count result of the counter 130.

In an example, the controller 140 may control the counting operation of the counter 130 by generating a mask signal for controlling the start and stop of the counting operation of the counter 130 and transmitting the generated mask signal to the counter 130. The mask signal may be used to enable or disable the counting operation of the counter 130. For example, the mask signal may be a binary signal having only two values, high and low. When the mask signal is high, the counting operation is enabled, and when the mask signal is low, the counting operation is disabled.

In another example, the controller 140 may calculate the frequency difference between the sensing clock signal and the reference clock signal by comparing the number of clocks of the sensing clock signal received from the counter 130 with the number of clocks of the reference clock signal received from the counter 130, The controller 140 may measure the mass or mass concentration of fine dust in the air based on the calculated frequency difference between the sensing clock signal and the reference clock signal. An operation of estimating the mass or mass concentration of fine dust in the air will be described in detail below.

Figure 2:
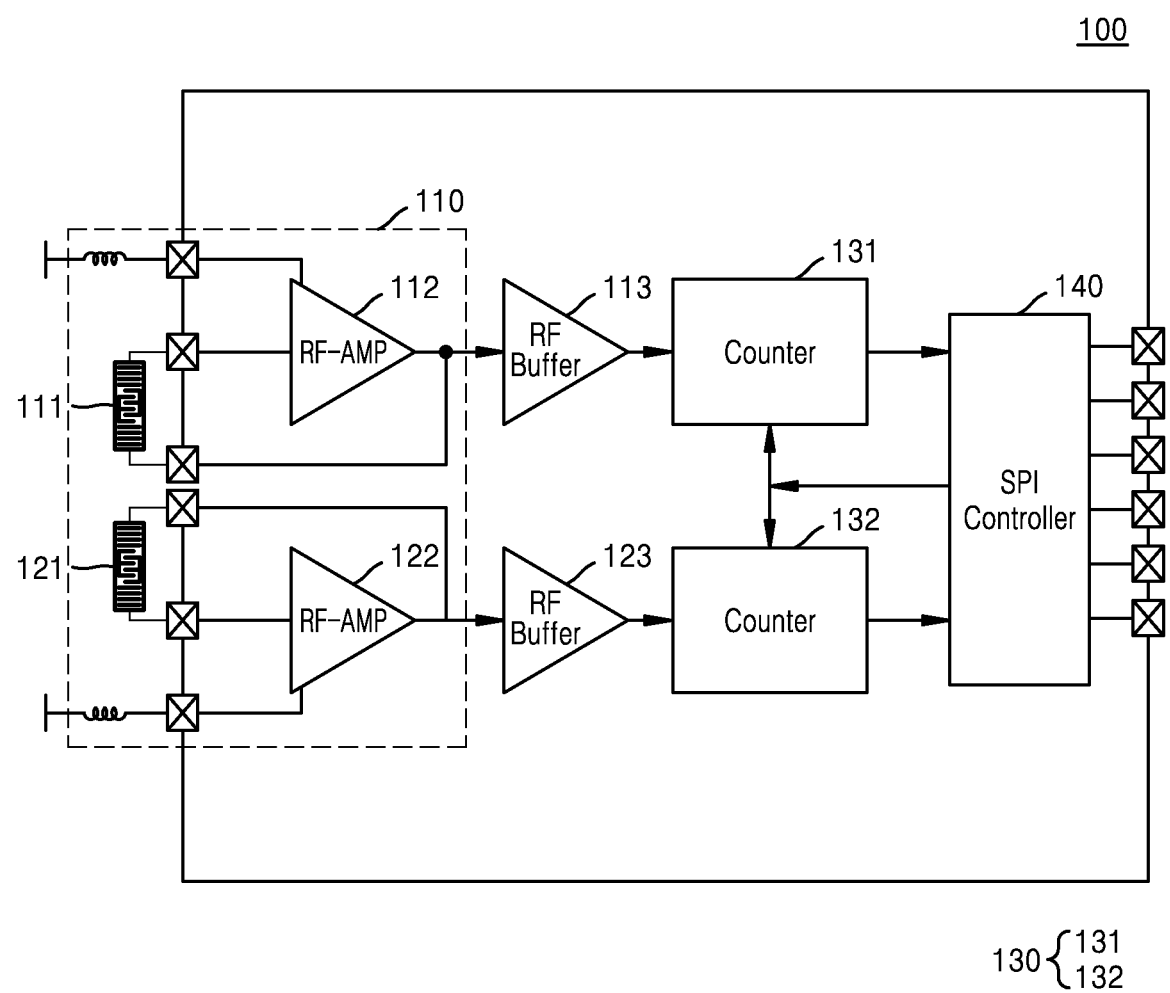
FIG. 2 is a circuit diagram illustrating elements of a fine dust mass measurement device, according to an embodiment.

FIG. 2 is a circuit diagram illustrating elements of a fine dust mass measurement device 100, according to an embodiment. At least one of the elements of the fine dust mass measurement device 100 illustrated in FIG. 2 may be substantially the same as or similar to at least one of the elements of the fine dust mass measurement device 100 illustrated in FIG. 1, and a redundant description thereof is omitted.

Referring to FIG. 2, the fine dust mass measurement device 100 according to an embodiment may include a sensing channel 110, a reference channel 120, a counter 130, and a controller 140. The elements of the fine dust mass measurement device 100 are not limited to the embodiment described above. According to embodiments, other elements (e.g., a first buffer 113 and a second buffer 123) may be added, or any one element may be omitted.

The sensing channel 110 may include a first surface acoustic wave sensor 111 and a first amplifier 112. The sensing channel 110 may generate a sensing clock signal by amplifying a surface acoustic wave generated by the first surface acoustic wave sensor 111. One possible implementation of the sensing channel 110 is a circuit configuration in which the first surface acoustic wave sensor 111 and the first amplifier 112 (e.g., an RF-AMP in FIG. 2) form a feedback loop so that the system gain of the sensing channel 110 satisfies the oscillation condition of the first surface acoustic wave sensor 111. However, a more detailed description of this configuration will be provided below.

The reference channel 120 may include a second surface acoustic wave sensor 121 and a second amplifier 122. The reference channel 120 may generate a reference clock signal by amplifying a surface acoustic wave generated by the second surface acoustic wave sensor 121. One possible implementation of the reference channel 120 is a circuit configuration in which the second surface acoustic wave sensor 121 and the second amplifier 122 (e.g., an RF-AMP of FIG. 2) form a feedback loop so that the system gain of the reference channel 120 satisfies the oscillation condition of the second surface acoustic wave sensor 121. However, a more detailed description of this configuration will be provided below.

The fine dust mass measurement device 100 according to an embodiment may further include first and second buffers 113 and 123 that stabilize the voltage of the sensing clock signal generated by the sensing channel 110 and/or the voltage of the reference clock signal generated by the reference channel 120. For example, the fine dust mass measurement device 100 may include the first buffer 113 disposed on an electrical path between the sensing channel 110 and the counter 130, and the second buffer 123 disposed on an electrical path between the reference channel 120 and the counter 130.

The first buffer 113 may have one end connected to an output terminal of the sensing channel 110 and another end connected to an input terminal of the counter 130. The first buffer 113 may control the voltage of the sensing clock signal transmitted from the sensing channel 110 to the counter 130.

The second buffer 123 may have one end connected to an output terminal of the reference channel 120 and another end connected to the input terminal of the counter 130. The second buffer 123 may control the voltage of the reference clock signal transmitted from the reference channel 120 to the counter 130.

When the operating voltage of the counter 130 is different from the voltage of the sensing clock signal and/or the reference clock signal, and the sensing clock signal and/or the reference clock signal are/is directly transmitted to the counter 130, noise may occur in the sensing clock signal and/or the reference clock signal due to the voltage difference.

The fine dust mass measurement device 100 according to an embodiment may lower the voltage of the sensing clock signal and/or the reference clock signal through the first buffer 113 and/or the second buffer 123, so as to reduce the difference between the sensing clock signal and/or the reference clock signal and the operating voltage of the counter 130. Accordingly, the fine dust mass measurement device 100 according to an embodiment may reduce noise occurring in the process of inputting the sensing clock signal and/or the reference clock signal to the counter 130.

The counter 130 may receive the sensing clock signal having passed through the first buffer 113 and/or the reference clock signal having passed through the second buffer 123, and may count the sensing clock signal and/or the reference clock signal based on the mask signal received from the controller 140. For example, the counter 130 may be an asynchronous counter including a plurality of flip-flops, Specifically, an output of each flip-flop may be connected to an input of a next flip-flop in sequence, so that the output of each flip-flop serves as a clock input to the next flip-flop, and each flip-flop toggles in response to a changing clock signal. However, the implementation of the counter 130 is not limited thereto, and the counter 130 may be implemented as a synchronous counter.

When the mask signal is received from the controller 140, the counter 130 may start counting the number of clocks of the sensing clock signal and/or the reference clock signal. When the mask signal is not received from the controller 140, the counter 130 may stop counting the number of clocks of the sensing clock signal and/or the reference clock signal.

According to an embodiment, the counter 130 may include a first counter 131 electrically connected to the sensing channel 110 and a second counter 132 electrically connected to the reference channel 120.

The first counter 131 may be electrically connected to the output terminal of the sensing channel 110 through the first buffer 113, and may generate a first output signal by counting the sensing clock signal transmitted from the sensing channel 110.

The second counter 132 may be electrically connected to the output terminal of the reference channel 120 through the second buffer 123, and may generate a second output signal by counting the reference clock signal transmitted from the reference channel 120.

In this case, the first counter 131 may generate the first output signal from the sensing clock signal in the form of a digital signal, and the second counter 132 may generate the second output signal from the reference clock signal in the form of a digital signal. The generated first output signal and/or the generated second output signal may be transmitted to the controller 140 electrically connected to the first counter 131 and/or the second counter 132.

The controller 140 may control the counting operation of the counter 130 and may measure the mass or mass concentration of fine dust in the air based on the first output signal and/or the second output signal received from the counter 130.

In an example, the controller 140 may generate a mask signal to control the start and stop of the counting operation of the counter 130, and may generate a reset signal to reset the counter 130. The controller 140 may transmit the generated mask signal and/or the generated reset signal to the counter 130 to control the counting operation. For example, the controller 140 may adjust the length of the mask signal to control the counting operation time of the counter 130, but the disclosure is not limited thereto.

In another example, the controller 140 may calculate the frequency difference between the sensing clock signal and the reference clock signal by comparing the first output signal and the second output signal received from the counter 130. The controller 140 may measure the mass or mass concentration of fine dust in the air based on the calculated frequency difference. For example, the controller 140 may calculate the frequency difference between the sensing clock signal and the reference clock signal based on the difference value between the first output signal and the second output signal output as digital signals, and may measure the mass or mass concentration of fine dust by estimating a change in mass of current fine dust with respect to mass of existing fine dust based on the calculated frequency difference.

The fine dust mass measurement device 100 according to an embodiment may be implemented in the form of system on chip (SoC). That is, the elements of the fine dust mass measurement device 100 may be integrated or mounted onto a single chip. Accordingly, the fine dust mass measurement device 100 according to an embodiment may be miniaturized, compared to the existing fine dust mass measurement device.

When the fine dust mass measurement device 100 is implemented in the form of SoC, the sensing channel 110 and the reference channel 120 may be placed next to or adjacent to each other. This proximity may result in noise in the sensing clock signal from the reference clock signal, or noise in the reference clock signal from the sensing clock signal when both of the sensing channel 110 and the reference channel 120 operate simultaneously.

Noise occurring in the sensing clock signal and/or the reference clock signal may deteriorate the accuracy of fine dust mass measurement. The fine dust mass measurement device 100 according to an embodiment may prevent deterioration in the accuracy of fine dust mass measurement due to noise by generating the sensing clock signal and the reference clock signal at certain time intervals.

For example, in the fine dust mass measurement device 100, the controller 140 may control the sensing channel 110 to generate the sensing clock signal after a specified time has elapsed from the time point at which the reference clock signal is generated by the reference channel 120. In contrast, the controller 140 may control the reference channel 120 to generate the reference clock signal after a specified time has elapsed from the time point at which the sensing clock signal is generated by the sensing channel 110.

That is, because the fine dust mass measurement device 100 according to an embodiment generates the sensing clock signal and the reference clock signal at specific time intervals, noise occurring due to mutual interference between the sensing clock signal and the reference clock signal may be reduced. As a result, even when the fine dust mass measurement device 100 is implemented in the form of SoC, the mass or mass concentration of fine dust may be precisely measured.

Hereinafter, the sensing channel 110 and/or the reference channel 120 will be described in detail with reference to FIGS. 3 to 5.

Figure 3:
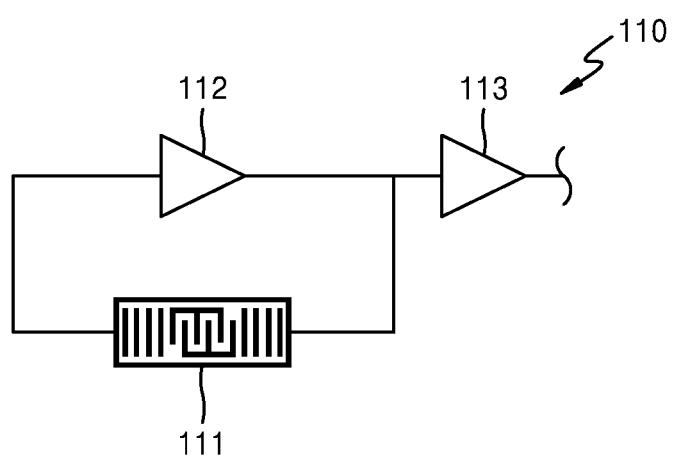
FIG. 3 is a circuit diagram illustrating a sensing channel of a fine dust mass measurement device, according to an embodiment.

FIG. 3 is a circuit diagram illustrating the sensing channel of the fine dust mass measurement device, according to an embodiment. In addition, FIG. 4 is a graph showing frequency characteristics (e.g., S parameter) of the surface acoustic wave sensor when fine dust with a first mass exists in the air, and FIG. 5 is a graph showing frequency characteristics of the surface acoustic wave sensor when fine dust with a second mass exists in the air.

Figure 4:
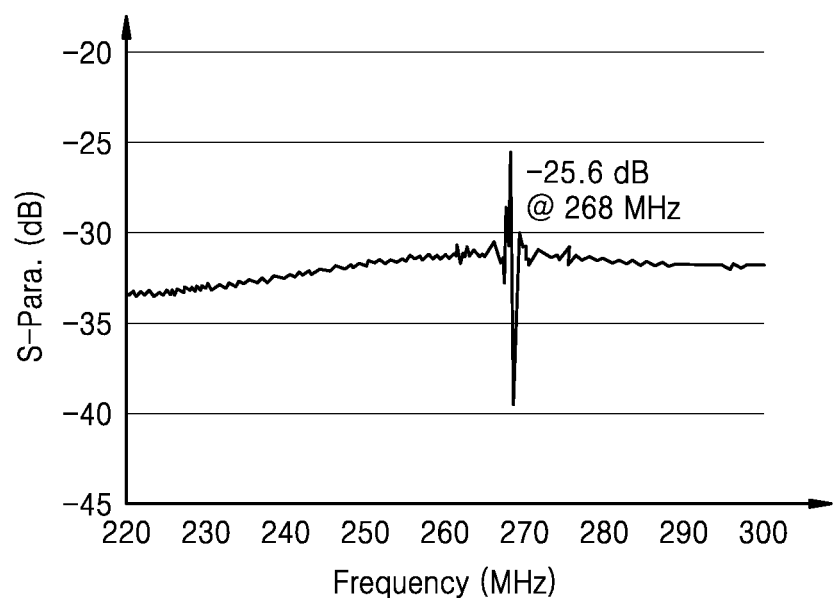
FIG. 4 is a graph showing frequency characteristics of a surface acoustic wave sensor when fine dust with a first mass exists in the air.
Figure 5:
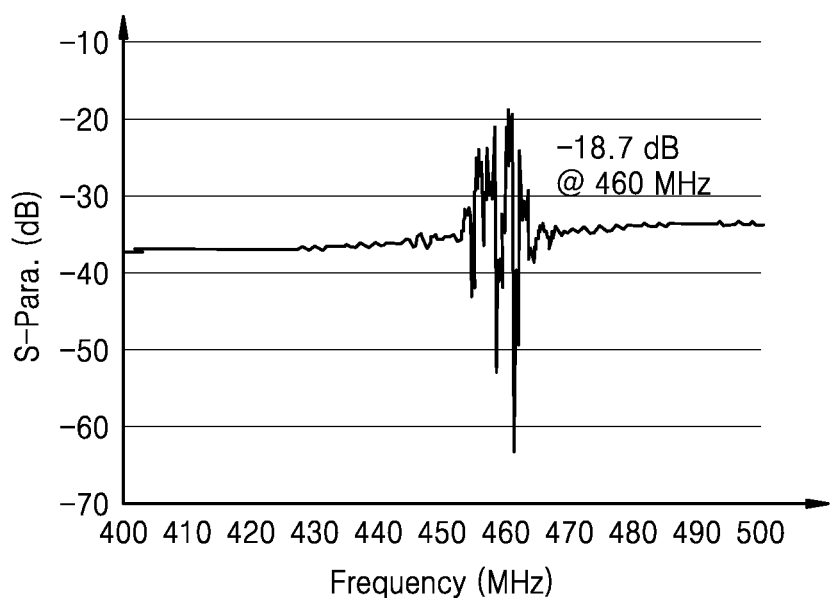
FIG. 5 is a graph showing frequency characteristics of a surface acoustic wave sensor when fine dust with a second mass exists in the air.

At this time, FIG. 4 shows frequency characteristics of the first surface acoustic wave sensor 111 for measuring fine dust of PM 2.5 in the air, and FIG. 5 shows frequency characteristics of the first surface acoustic wave sensor 111 for measuring fine dust of PM 1.0 in the air.

Referring to FIG. 3, the sensing channel 110 of the fine dust mass measurement device (e.g., the fine dust mass measurement device 100 of FIG. 2) according to an embodiment may include the first surface acoustic wave sensor 111 and the first amplifier 112.

The sensing channel 110 may be implemented as a circuit that forms a feedback loop between the first surface acoustic wave sensor 111 and the first amplifier 112 in order to satisfy the oscillation condition of the first surface acoustic wave sensor 111 at the resonant frequency.

Referring to FIGS. 4 and 5, the first surface acoustic wave sensor 111 may be designed to oscillate at different resonant frequencies depending on the size of fine dust in the air.

In an example, as illustrated in FIG. 4, in a case where the size of fine dust in the air is PM 2.5, when the frequency of the first surface acoustic wave sensor 111 is about 268 MHz, the value of the S parameter (S21) rises rapidly to −25.6 dB. Therefore, it may be confirmed that the resonant frequency of the first surface acoustic wave sensor 111 is about 268 MHz in the corresponding condition.

Another example is illustrated in FIG. 5, where the size of fine dust in the air is PM 1.0. In this case, when the frequency of the first surface acoustic wave sensor 111 is about 460 MHz, the value of the S parameter (S21) rises rapidly to −18.7 dB. Therefore, it may be confirmed that the resonant frequency of the first surface acoustic wave sensor 111 is about 460 MHz in the corresponding condition.

The resonant frequency of the first surface acoustic wave sensor 111 changes as the mass concentration of fine dust in the air changes. When the system gain of the sensing channel 110 is lower than 0 dB at the resonant frequency, the first surface acoustic wave sensor 111 may not oscillate at the resonant frequency.

In the fine dust mass measurement device according to an embodiment, the sensing channel 110 may implement a feedback loop through the first surface acoustic wave sensor 111 and the first amplifier 112 including a metal-oxide semiconductor field effect transistor (MOSFET) and a filter, so that the system gain of the sensing channel 110 may maintain 0 dB or more. Through the circuit structure described above, the sensing channel 110 of the fine dust mass measurement device according to an embodiment may maintain the oscillation condition even when the mass concentration of fine dust in the air changes and thus the resonant frequency changes. Thus, the sensing clock signal may be stably generated.

Although only the structure of the sensing channel 110 is disclosed in FIG. 3, the reference channel (e.g., the reference channel 120 of FIG. 2) of the fine dust mass measurement device may also be implemented in a structure substantially identical to or similar to that of the sensing channel 110. For example, the reference channel may be implemented in the form of a circuit in which the second surface acoustic wave sensor (e.g., the second surface acoustic wave sensor 121 of FIG. 2) and the second amplifier (e.g., the second amplifier 122 of FIG. 2) form a feedback loop, so that the system gain of the reference channel may maintain 0 dB or more. A redundant description thereof is omitted.

Hereinafter, the operation, performed by the counter (e.g., the counter 130 of FIG. 2), of counting the sensing clock signal and the reference clock signal will be described in detail with reference to FIGS. 6 and 7.

Figure 6:
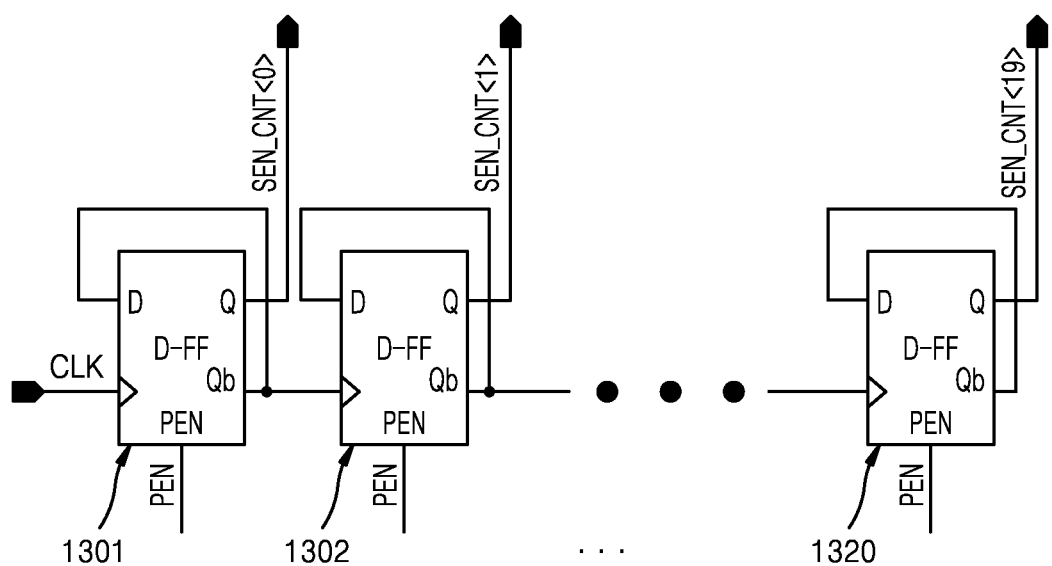
FIG. 6 is a circuit diagram illustrating a counter of a fine dust mass measurement device, according to an embodiment.

FIG. 6 is a circuit diagram illustrating a counter 130 of a fine dust mass measurement device, according to an embodiment. The counter 130 illustrated in FIG. 6 may be an embodiment of the first counter 131 or the second counter 132 of the fine dust mass measurement device 100 illustrated in FIG. 2, and a redundant description thereof is omitted.

Referring to FIG. 6, the counter 130 of the fine dust mass measurement device (e.g., the fine dust mass measurement device 100 of FIG. 2), according to an embodiment, may include an asynchronous counter including a plurality of flip-flops. For example, the counter 130 may be an asynchronous counter implemented by a plurality of D-flip-flops. Although FIG. 6 illustrates an embodiment in which the counter 130 is a 20-bit asynchronous counter implemented by 20 D-flip-flops 1301, 1302, 1320, the number of flip-flops is not limited to the illustrated embodiment.

The asynchronous counter may be a counter in which an output of one of the flip-flops connected in sequence is utilized as the clock signal of the next flip-flop. For example, when the counter 130 is an asynchronous counter, an output signal (e.g., SEN_CNT<0> in FIG. 6) generated by the first flip-flop 1301 when the sensing clock signal or the reference clock signal is input may be input as the clock signal of the second flip-flop 1302. In addition, an output signal (e.g., SEN_CNT<N−2>) of an $(N-1)^{th}$ flip-flop (where N is a natural number greater than or equal to 2) may be input as a clock signal of an $N^{th}$ flip-flop. As a result, output signals may be sequentially generated from the flip-flops by the input of the sensing clock signal or the reference clock signal.

In the disclosure, 'the first output signal generated by the counter 130 based on the sensing clock signal' may refer to a set of output signals generated by the flip-flops 1301, 1302, . . . , 1320 when the sensing clock signal is input to the first flip-flop 1301. For example, the first output signal may refer to a set of output signals of a binary format generated by the flip-flops by the input of the sensing clock signal.

In addition, in the disclosure, 'the second output signal generated by the counter 130 based on the reference clock signal' may refer to a set of output signals generated by the flip-flops 1301, 1302, . . . , 1320 when the reference clock signal is input to the first flip-flop 1301. For example, the second output signal may refer to a set of output signals of a binary format generated by the flip-flops by the input of the reference clock signal.

The fine dust mass measurement device according to an embodiment may implement the counter 130 with a simple circuit through an asynchronous counter implemented by N flip-flops, compared to a synchronous counter. The resolution performance (or 'resolution') of the fine dust mass measurement device may be improved by adjusting the number of N flip-flops. For example, the fine dust mass measurement device may have a resolution of 1 ppm or less by utilizing 20 flip-flops. As a result, the mass or mass concentration of fine dust may be measured more accurately.

Hereinafter, the operation, performed by the flip-flops, of generating the output signals when the mask signal and the clock signal (e.g., the sensing clock signal or the reference clock signal) are input to the counter 130 illustrated in FIG. 6 will be described in detail with reference to FIG. 7.

Figure 7:
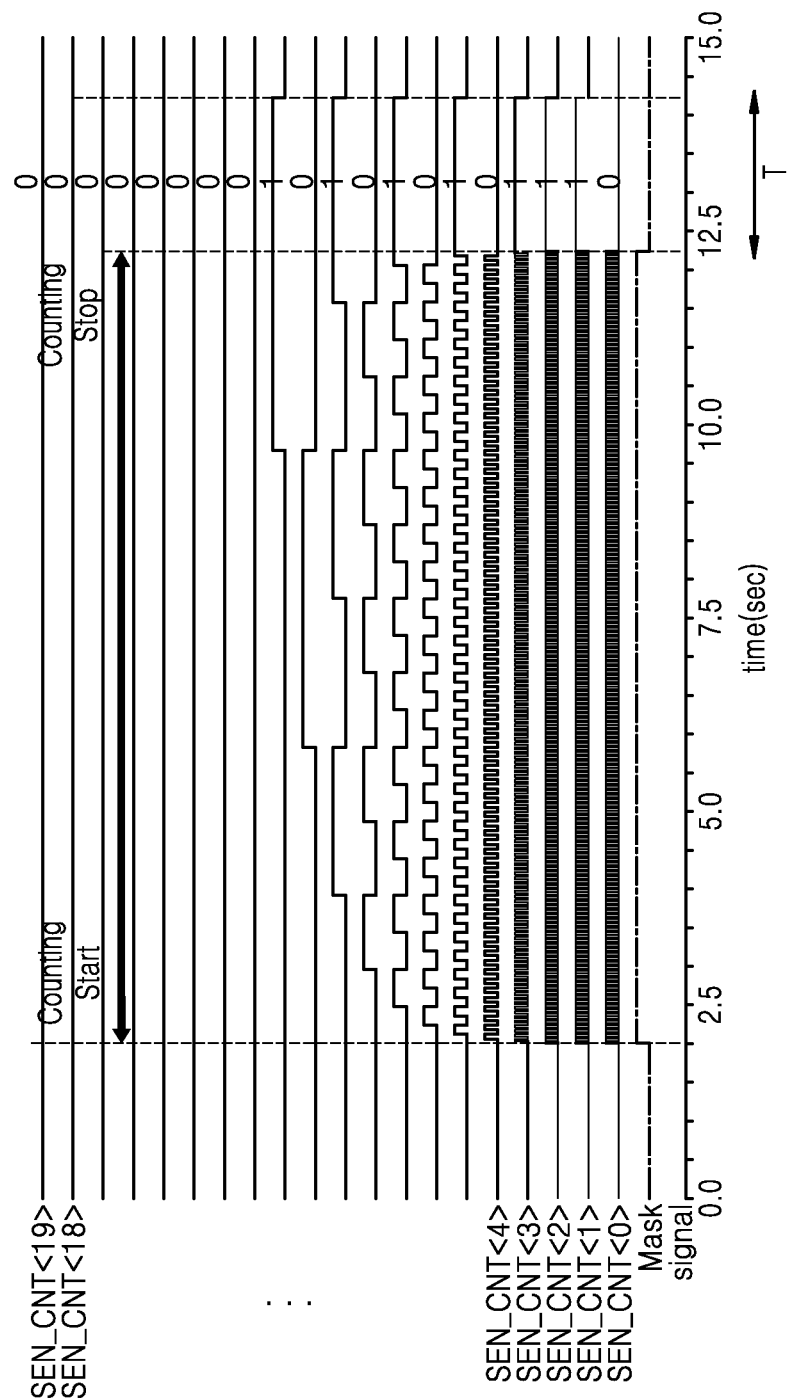
FIG. 7 is a graph showing a change in outputs of a plurality of flip-flops over time when a mask signal is applied to a counter of a fine dust mass measurement device, according to an embodiment.

FIG. 7 is a graph showing a change in the outputs of the flip-flops over time when the mask signal is applied to the counter of the fine dust mass measurement device, according to an embodiment. Hereinafter, the graph of FIG. 7 will be described with reference to the elements of the counter 130 illustrated in FIG. 6.

Referring to FIG. 7, when the mask signal is received from the controller (e.g., the controller 140 of FIG. 2), the counter 130 of the fine dust mass measurement device according to an embodiment may perform an operation of counting the number of clocks of the clock signal input to the counter 130.

According to an embodiment, the counter 130 may be the asynchronous counter including the flip-flops 1301, 1302, . . . , 1320 that are connected in series or cascaded, where the output of each flip-flop is connected to the input of the next flip-flop. When the mask signal is applied to the counter 130, the flip-flops may sequentially count the number of clocks of the clock signal. The number of clocks of the clock signal may refer to the number of rising edges or falling edges of the clock signal, or number of high states of the clock signal. The number of clocks may correspond to the number of oscillations.

For example, when the mask signal is applied to the counter 130, the first flip-flop 1301 may count the number of clocks of the clock signal (e.g., the sensing clock signal or the reference clock signal) and generate an output signal SEN_CNT<0>.

In addition, the output signal SEN_CNT<0> of the first flip-flop 1301 may be input to the second flip-flop 1302 as the clock signal, and the second flip-flop 1302 may count the number of clocks of the output signal SEN_CNT<0> of the first flip-flop 1301 and generate an output signal SEN_CNT<1>. In this manner, the output signal (e.g., SEN_CNT<N−2>) of the (N−1)$^{th}$ flip-flop (where N is a natural number greater than or equal to 2) may be input as the clock signal of the N$^{th}$ flip-flop. As a result, the flip-flops 1301, 1302, . . . , 1320 may sequentially generate the output signals.

The controller of the fine dust mass measurement device, according to an embodiment, may receive the output signal (e.g., the first output signal or the second output signal) from the counter 130 after a specified time (e.g., T in FIG. 7) has elapsed from the time point at which the input of the mask signal is ended, considering characteristics that the output signal of the previous flip-flop of the asynchronous counter is the input signal of the next flip-flop. In the disclosure, the 'specified time T' may refer to the delay or offset of the output signal caused by characteristics of the asynchronous counter, and the corresponding expression may be used in the same meaning below.

As illustrated in FIG. 7, due to characteristics of the asynchronous counter, even when the input of the mask signal to the counter 130 is stopped, the output signals of the flip-flops may maintain a constant value for the specified time T.

Accordingly, the controller of the fine dust mass measurement device, according to an embodiment, may receive the output signal (e.g., the first output signal or the second output signal) from the counter 130 after the specified time T has elapsed from the time point at which the counting operation of the counter 130 is stopped due to the interruption of the input of the mask signal.

For example, as illustrated in FIG. 7, the controller of the fine dust mass measurement device may receive an output signal of a binary format '00000000101010101110' after the specified time T has elapsed from the time point at which the counting operation of the counter 130 is stopped (e.g., the counting stop point in FIG. 7), but the disclosure is not limited thereto.

The controller of the fine dust mass measurement device, according to an embodiment, may reset the counter 130 to measure the mass of fine dust in the air, or count the number of clocks of a new clock signal based on the received output signal of the counter 130. Hereinafter, operations of measuring the mass of fine dust in the fine dust mass measurement device will be described in detail with reference to FIGS. 8 to 10.

Figure 8:
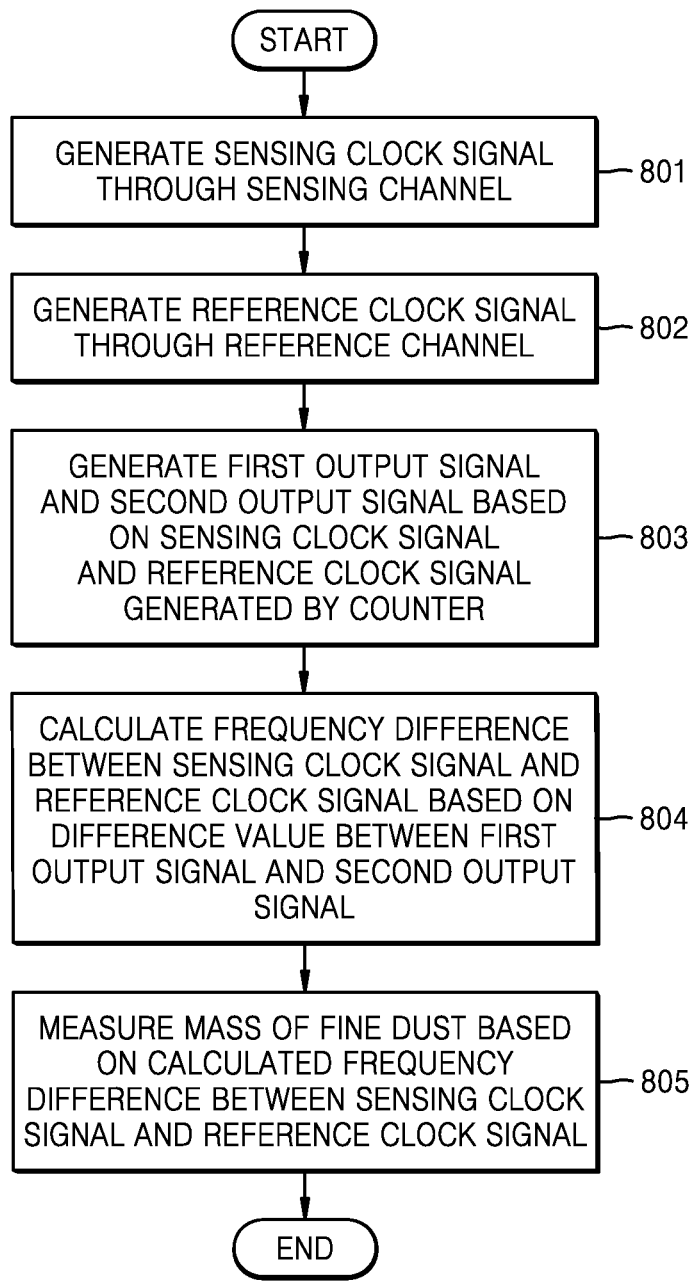
FIG. 8 is a flowchart for describing an operation of measuring mass of fine dust by a fine dust mass measurement device, according to an embodiment.

FIG. 8 is a flowchart for describing the operations of measuring the mass of fine dust in the fine dust mass measurement device, according to an embodiment. Hereinafter, the operations of measuring the mass of fine dust in FIG. 8 will be described with reference to the elements of the fine dust mass measurement device 100 illustrated in FIG. 2.

Referring to FIG. 8, in operation 801, the fine dust mass measurement device 100 according to an embodiment may generate the sensing clock signal through the sensing channel 110. For example, the sensing channel 110 may generate the sensing clock signal by amplifying the surface acoustic wave generated by the first surface acoustic wave sensor 111 through the first amplifier 112, and may transmit the generated sensing clock signal to the counter 130. In this case, the sensing clock signal may refer to a clock signal, a resonant frequency of which changes according to a change in the mass or mass concentration of fine dust in the air, and the corresponding expression may be used in the same meaning below.

In operation 802, the fine dust mass measurement device 100 according to an embodiment may generate the reference clock signal through the reference channel 120. For example, the reference channel 120 may generate the reference clock signal by amplifying the surface acoustic wave generated by the second surface acoustic wave sensor 121 through the second amplifier 122, and may transmit the generated reference clock signal to the counter 130. In this case, unlike the sensing clock signal, the reference clock signal may refer to a clock signal having a constant resonant frequency, regardless of a change in mass or mass concentration of fine dust, and the corresponding expression may be used in the same meaning below.

The fine dust mass measurement device 100 according to an embodiment may perform operations 801 and 802 at certain time intervals in order to prevent noise from occurring in the process of generating the reference clock signal due to the sensing clock signal, or to prevent noise from occurring in the reference clock signal in the process of generating the sensing clock signal.

For example, the fine dust mass measurement device 100 may perform operation 802 after a specified time has elapsed from the time point at which operation 801 is performed, or may perform operation 801 after a specified time has elapsed from the time point at which operation 802 is performed.

Because the sensing clock signal and the reference clock signal are generated at set time intervals, mutual interference between the sensing clock signal and the reference clock signal may be prevented. As a result, the fine dust mass measurement device 100 may prevent the accuracy of fine dust mass measurement from deteriorating due to noise.

In operation 803, the fine dust mass measurement device 100 according to an embodiment may generate the first output signal and the second output signal based on the sensing clock signal generated in operation 801 by the counter 130 and/or the reference clock signal generated in operation 802 by the counter 130.

In an example, the counter 130 may generate the first output signal by counting the number of clocks of the sensing clock signal received from the sensing channel 110. In another example, the counter 130 may generate the second output signal by counting the number of clocks of the reference clock signal received from the reference channel 120. In this case, the first output signal and the second output signal may be generated in the form of a digital signal, and may be transmitted to the controller 140.

According to an embodiment, the counter 130 may include an asynchronous counter including a plurality of flip-flops (e.g., delay flip-flops which are also referred to as D-type flip-flops), but the type of counter 130 is not limited thereto.

In operation 804, the fine dust mass measurement device 100 according to an embodiment may calculate the frequency difference between the sensing clock signal and the reference clock signal based on the difference value between the first output signal and the second output signal, which are generated in operation 803.

According to an embodiment, the controller 140 of the fine dust mass measurement device 100 may receive the first output signal and the second output signal from the counter 130, and may calculate the frequency difference between the sensing clock signal and the reference clock signal based on the difference value between the received first output signal and the received second output signal. For example, the controller 140 may calculate the frequency difference between the sensing clock signal and the reference clock signal based on the difference value between the first output signal and the second output signal and the length of the mask signal applied from the controller 140 to the counter 130, but a detailed description thereof will be described below.

In operation 805, the fine dust mass measurement device 100 according to an embodiment may measure the mass or mass concentration of fine dust in the air based on the frequency difference between the sensing clock signal and the reference clock signal, which is calculated in operation 804. For example, the controller 140 of the fine dust mass measurement device 100 may estimate a change of current fine dust mass with respect to reference fine dust mass by comparing preset data with the frequency difference between the sensing clock signal and the reference clock signal, and may measure the mass or mass concentration of fine dust in the current air based on a result of the estimating.

In the disclosure, the 'preset data' may refer to data representing a relationship between the frequency of the clock signal and the mass concentration of fine dust, and the corresponding data may be stored in the controller 140 or a memory (not illustrated) electrically connected to the controller 140.

Because the fine dust mass measurement device 100 according to an embodiment measures the mass or mass concentration of fine dust by using the counter 130 in operations 803 to 805, power consumption may be reduced, compared to the case of measuring the mass or mass concentration of fine dust by using a mixer.

While the mass or mass concentration of fine dust is measured, the power consumption of the mixer is about 1.6 mW, but the power consumption of the counter 130 is only about 0.077 mW. Therefore, unlike the conventional fine dust mass measurement device using the mixer, the fine dust mass measurement device 100 according to an embodiment may precisely measure the mass or mass concentration of fine dust while reducing power consumption.

Hereinafter, the operation of calculating the frequency difference between the sensing clock signal and the reference clock signal in the fine dust mass measurement device 100 will be described in detail with reference to FIG. 9.

Figure 9:
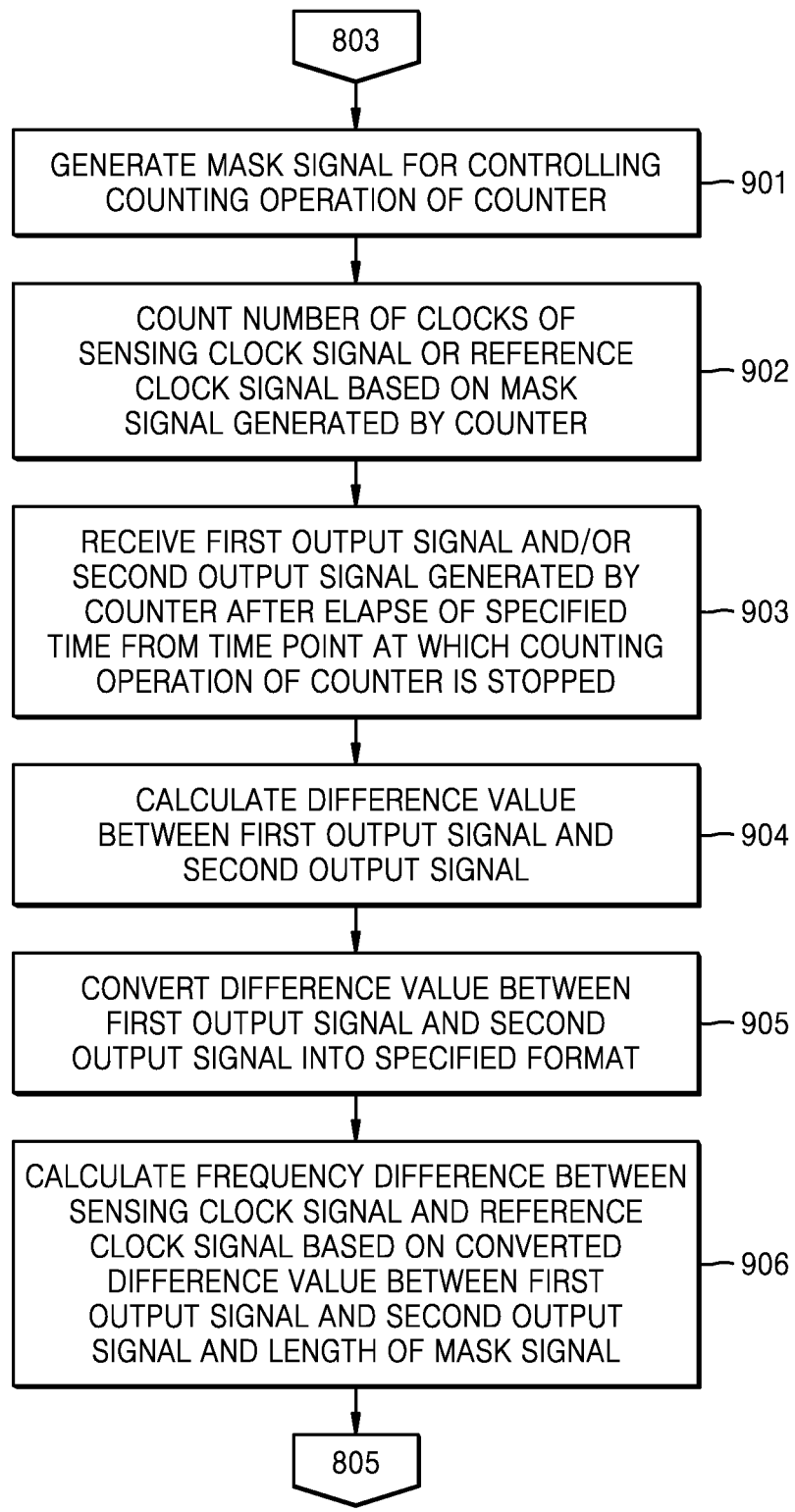
FIG. 9 is a flowchart for describing an operation of calculating a frequency difference between a sensing clock signal and a reference clock signal by a fine dust mass measurement device, according to an embodiment.

FIG. 9 is a flowchart for describing the operation of calculating the frequency difference between the sensing clock signal and the reference clock signal in the fine dust mass measurement device, according to an embodiment.

FIG. 9 is a flowchart for describing operations 803 and 804 of FIG. 8 in detail. Hereinafter, the operations of calculating the frequency difference between the sensing clock signal and the reference clock signal in the fine dust mass measurement device in FIG. 9 will be described with reference to the elements of the fine dust mass measurement device 100 illustrated in FIG. 2.

Referring to FIG. 9, in operation 901, the controller 140 of the fine dust mass measurement device 100, according to an embodiment, may generate the mask signal for controlling the counting operation of the counter 130. The mask signal may be, for example, a signal for controlling the counter 130 to start or stop counting the sensing clock signal and the reference clock signal, which are generated in operations 801 and 802.

According to an embodiment, the controller 140 may control not only the start and stop of the counting operation of the counter 130 but also the counting operation time by adjusting the length of the mask signal. In the disclosure, the 'counting operation time' may refer to the time from the counting start to the counting stop, and the corresponding expression may be used in the same meaning below.

For example, the controller 140 may increase the counting operation time of the counter 130 by increasing the length of the mask signal, or may decrease the counting operation time of the counter 130 by decreasing the length of the mask signal.

In operation 902, the fine dust mass measurement device 100 according to an embodiment may count the number of clocks of the sensing clock signal or the reference clock signal based on the mask signal generated in operation 901 by the counter 130 (e.g., the asynchronous counter).

For example, the counter 130 may receive the mask signal from the controller 140 and generate the first output signal by counting the number of clocks of the sensing clock signal. In addition, the counter 130 may receive the mask signal from the controller 140 and generate the second output signal by counting the number of clocks of the reference clock signal. Operation 902 may be substantially the same as or similar to operation 803 of FIG. 8, and a redundant description thereof is omitted.

In operation 903, the controller 140 of the fine dust mass measurement device 100, according to an embodiment, may receive the output signal (e.g., the first output signal or the second output signal) from the counter 130 after a specified time (e.g., T in FIG. 7) has elapsed from the time point at which the counting operation of the counter 130 is stopped due to the interruption of the input of the mask signal.

When the counter 130 is an asynchronous counter, the delay or offset of the output signal may occur due to characteristics of the asynchronous counter. As a result, the flip-flops of the counter 130 may constantly maintain the output values until a specified time has elapsed from the time point at which the input of the mask signal is stopped.

The controller 140 may receive the first output signal and the second output signal in the form of a digital signal from the counter 130 after a specified time has elapsed from the time point at which the counting operation of the counter 130 is stopped, considering these characteristics of the asynchronous counter.

In operation 904, the controller 140 of the fine dust mass measurement device 100, according to an embodiment, may calculate the difference value between the first output signal and the second output signal, which are received in operation 903. For example, the controller 140 may compare the first output signal and the second output signal, which are output in the form of a digital signal in operation 903, and may calculate the difference value between the first output signal and the second output signal. In this case, the difference value between the first output signal and the second output signal may be expressed in a binary format.

In operation 905, the controller 140 of the fine dust mass measurement device 100, according to an embodiment, may convert the difference value between the first output signal and the second output signal, which is calculated in operation 904, into a specified format. For example, the controller 140 may convert the difference value between the first output signal and the second output signal, which is expressed in a binary format or a binary number, into a decimal format or a decimal number.

In operation 906, the controller 140 of the fine dust mass measurement device 100, according to an embodiment, may calculate the frequency difference between the sensing clock signal and the reference clock signal based on the difference value between the first output signal and the second output signal, the format of which is converted in operation 905, as well as the length of time during which the mask signal enables the counting operation.

The output signal of the counter 130 represents the number of clocks during the length of the mask signal (i.e., the length of the counting operation enablement time of the mask signal). Using information of the number of clocks, the controller 140 may calculate the frequency difference between the sensing clock signal and the reference clock signal by dividing the difference value between the first output signal and the second output signal, which is converted into a decimal number, by the length of the mask signal as expressed in Equation 1.

$$\text{Frequency difference between sensing clock signal and reference clock signal} = \frac{\text{(Difference between first ouput signal and second output signal)}}{\text{Length of mask signal}}$$ [Equation 1]

The controller 140 of the fine dust mass measurement device 100, according to an embodiment, may calculate the mass or mass concentration of fine dust in the air by comparing the calculated frequency difference between the sensing clock signal and the reference clock signal with the preset data and calculating the change in the mass of fine dust in the air with respect to the reference mass of fine dust.

Hereinafter, the operation, performed by the controller 140, of processing the first output signal and the second output signal will be described in detail with reference to FIG. 10.

Figure 10:
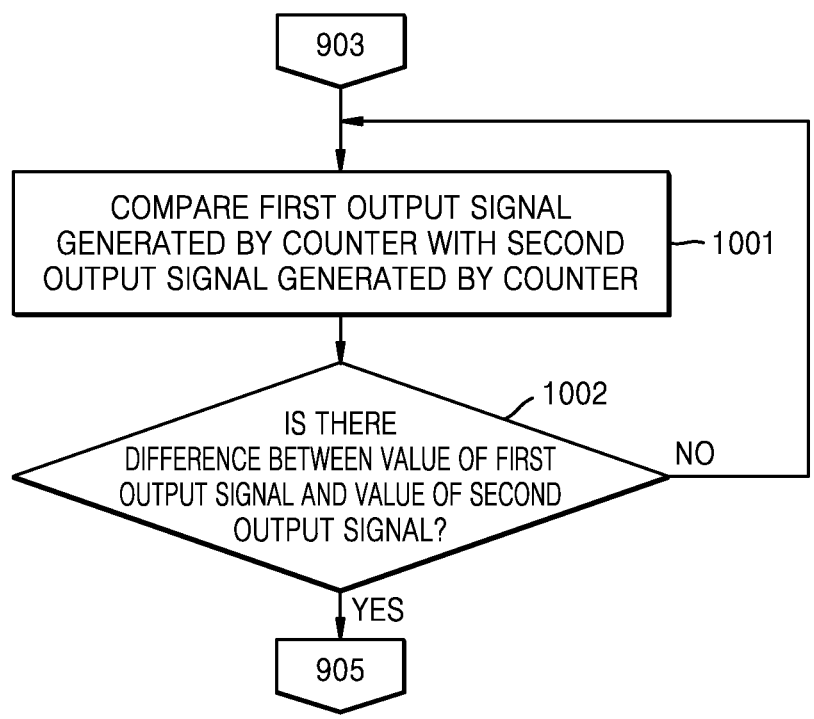
FIG. 10 is a flowchart for describing an operation of processing a first output signal and a second output signal, which are generated by a counter of a fine dust mass measurement device, according to an embodiment.

FIG. 10 is a flowchart for describing the operation of processing the first output signal and the second output signal, which are generated by the counter of the fine dust mass measurement device, according to an embodiment.

FIG. 10 is a flowchart for describing operation 904 of FIG. 9 in detail. Hereinafter, the operations of FIG. 10 will be described with reference to the elements of the fine dust mass measurement device 100 illustrated in FIG. 2.

Referring to FIG. 10, in operation 1001, the controller 140 of the fine dust mass measurement device 100, according to an embodiment, may compare the first output signal received in operation 903 with the second output signal received in operation 903.

In operation 1002, the controller 140 of the fine dust mass measurement device 100, according to an embodiment, may determine whether there is the difference between the value of the first output signal and the value of the second output signal based on a result of the comparing in operation 1001.

For example, when the mass or mass concentration of fine dust in the air changes, the difference between the value of the first output signal and the value of the second output signal as the reference occurs. Therefore, the controller 140 may determine whether there is the difference between the value of the first output signal and the value of the second output signal, so as to check the change in the mass of fine dust in the air.

When it is determined in operation 1002 that there is the difference between the value of the first output signal and the value of the second output signal, the controller 140 of the fine dust mass measurement device 100, according to an embodiment, may convert the difference value between the first output signal and the second output signal into a preset format (e.g., the decimal number) through operation 905, and may calculate the frequency difference between the sensing clock signal and the reference clock signal based on the converted difference value between the first output signal and the second output signal.

In contrast, when it is determined in operation 1002 that there is no difference between the value of the first output signal and the value of the second output signal, the controller 140 of the fine dust mass measurement device 100, according to an embodiment, may determines that the mass of fine dust has not changed and may repeat operation 1001 again.

When it is determined in operations 1001 and 1002 that there is no difference between the first output signal and the second output signal, the fine dust mass measurement device 100 according to an embodiment may prevent the controller 140 from performing unnecessary calculation. As a result, overall power consumption of the fine dust mass measurement device 100 may be reduced.

On the other hand, the fine dust mass measurement method of the fine dust mass measurement device may be recorded on a computer-readable recording medium in which one or more programs including instructions for executing the fine dust mass measurement method are recorded. Examples of the computer-readable recording medium may include hardware devices specially configured to store and execute program commands, such as magnetic media (e.g., hard disk, floppy disk, magnetic tape, etc.), optical media (e.g., compact disc read-only memory (CD-ROM), digital versatile disc (DVD), etc.), magneto-optical media (e.g., floptical disk, etc.), read-only memory (ROM), random access memory (RAM), and flash memory. Examples of the program instructions may include not only machine language code generated by a compiler but also high-level language code that is executable using an interpreter by a computer.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A dust mass measurement device comprising:
   a sensing channel configured to generate a sensing clock signal, the sensing channel comprising a first surface acoustic wave sensor configured to generate a surface acoustic wave and a first amplifier configured to amplify the surface acoustic wave generated by the first surface acoustic wave sensor;
   a reference channel configured to generate a reference clock signal, the reference channel comprising a second surface acoustic wave sensor configured to generate a surface acoustic wave and a second amplifier configured to amplify the surface acoustic wave generated by the second surface acoustic wave sensor;
   a counter electrically connected to the sensing channel and the reference channel and configured to generate a first output signal based on the sensing clock signal, and generate a second output signal based on the reference clock signal; and
   a controller electrically connected to the counter and configured to:
   calculate a frequency difference between the sensing clock signal and the reference clock signal based on a difference value between the first output signal and the second output signal; and
   measure a mass of particulate matter based on the frequency difference between the sensing clock signal and the reference clock signal.

2. The fine dust mass measurement device of claim 1, wherein the first surface acoustic wave sensor and the first amplifier form a feedback loop.

3. The fine dust mass measurement device of claim 1, wherein the second surface acoustic wave sensor and the second amplifier form a feedback loop.

4. The dust mass measurement device of claim 1, further comprising a first buffer having one end connected to the sensing channel and another end connected to the counter, the first buffer being configured to adjust a voltage of the sensing clock signal transmitted from the sensing channel to the counter.

5. The dust mass measurement device of claim 1, further comprising a second buffer having one end connected to the reference channel and another end connected to the counter, the second buffer being configured to adjust a voltage of the reference clock signal transmitted from the reference channel to the counter.

6. The dust mass measurement device of claim 1, wherein the controller is further configured to control the sensing channel to generate the sensing clock signal after a specified time has elapsed from a time point at which the reference clock signal is generated by the reference channel.

7. The dust mass measurement device of claim 1, wherein the counter comprises an asynchronous counter comprising a plurality of flip-flops.

8. The dust mass measurement device of claim 1, wherein the counter comprises:
   a first asynchronous counter electrically connected to the sensing channel and configured to generate the first output signal based on the sensing clock signal; and
   a second asynchronous counter electrically connected to the reference channel and configured to generate the second output signal based on the reference clock signal.

9. The dust mass measurement device of claim 8, wherein each of the first asynchronous counter and the second asynchronous counter comprises a plurality of D-type flip-flops that are connected in series.

10. The dust mass measurement device of claim 7, wherein the controller is further configured to generate a mask signal for enabling a counting operation of the counter, and
   the counter is further configured to count a number of clocks of the sensing clock signal or the reference clock signal based on the mask signal received from the controller.

11. The dust mass measurement device of claim 10, wherein the controller is further configured to receive the first output signal or the second output signal from the counter after a specified time has elapsed from a time point at which the counting operation of the counter is stopped.

12. The dust mass measurement device of claim 11, wherein the controller is further configured to reset the counter when the first output signal or the second output signal is received from the counter.

13. The dust mass measurement device of claim 10, wherein the controller is further configured to:
   convert the difference value between the first output signal and the second output signal, which are received from the counter, into a preset format; and
   calculate the frequency difference between the sensing clock signal and the reference clock signal based on the converted difference value between the first output signal and the second output signal and a length of the mask signal.

14. The dust mass measurement device of claim 13, wherein the controller is further configured to:
   convert the difference value between the first output signal and the second output signal, which is output as a digital signal, into a decimal number; and
   calculate the frequency difference between the sensing clock signal and the reference clock signal by dividing the decimal number indicating the difference value between the first output signal and the second output signal, by the length of the mask signal.

15. An operating method of a dust mass measurement device, the operating method comprising:
   generating a sensing clock signal through a sensing channel, the sensing channel including a first surface acoustic wave sensor configured to generate a surface acoustic wave and a first amplifier configured to amplify the surface acoustic wave generated by the first surface acoustic wave sensor;

generating a reference clock signal through a reference channel, the reference channel including a second surface acoustic wave sensor configured to generate a surface acoustic wave and a second amplifier configured to amplify the surface acoustic wave generated by the second surface acoustic wave sensor;

generating a first output signal through an asynchronous counter based on the sensing clock signal;

generating a second output signal through the asynchronous counter based on the reference clock signal;

calculating a frequency difference between the sensing clock signal and the reference clock signal through a controller based on a difference value between the first output signal and the second output signal; and measuring a mass of particulate matter through the controller based on the frequency difference between the sensing clock signal and the reference clock signal.

16. The operating method of claim 15, wherein the generating of the sensing clock signal comprises generating the sensing clock signal after a specified time has elapsed from a time point at which the reference clock signal is generated.

17. The operating method of claim 15, wherein the calculating of the frequency difference between the sensing clock signal and the reference clock signal comprises:

generating a mask signal for enabling a counting operation of the asynchronous counter;

counting a number of clocks of the sensing clock signal or the reference clock signal based on the generated mask signal; and receiving the first output signal or the second output signal after a specified time has elapsed from a time point at which the counting operation of the asynchronous counter is stopped.

18. The operating method of claim 17, wherein the calculating of the frequency difference between the sensing clock signal and the reference clock signal comprises:

converting the difference value between the received first output signal and the received second output signal into a preset format; and calculating the frequency difference between the sensing clock signal and the reference clock signal based on the converted difference value between the first output signal and the second output signal and a length of the mask signal.

19. The operating method of claim 17, further comprising resetting the asynchronous counter when the first output signal or the second output signal is received.

20. A computer-readable recording medium having recorded thereon a program for implementing the operating method of claim 15.

* * * * *